…

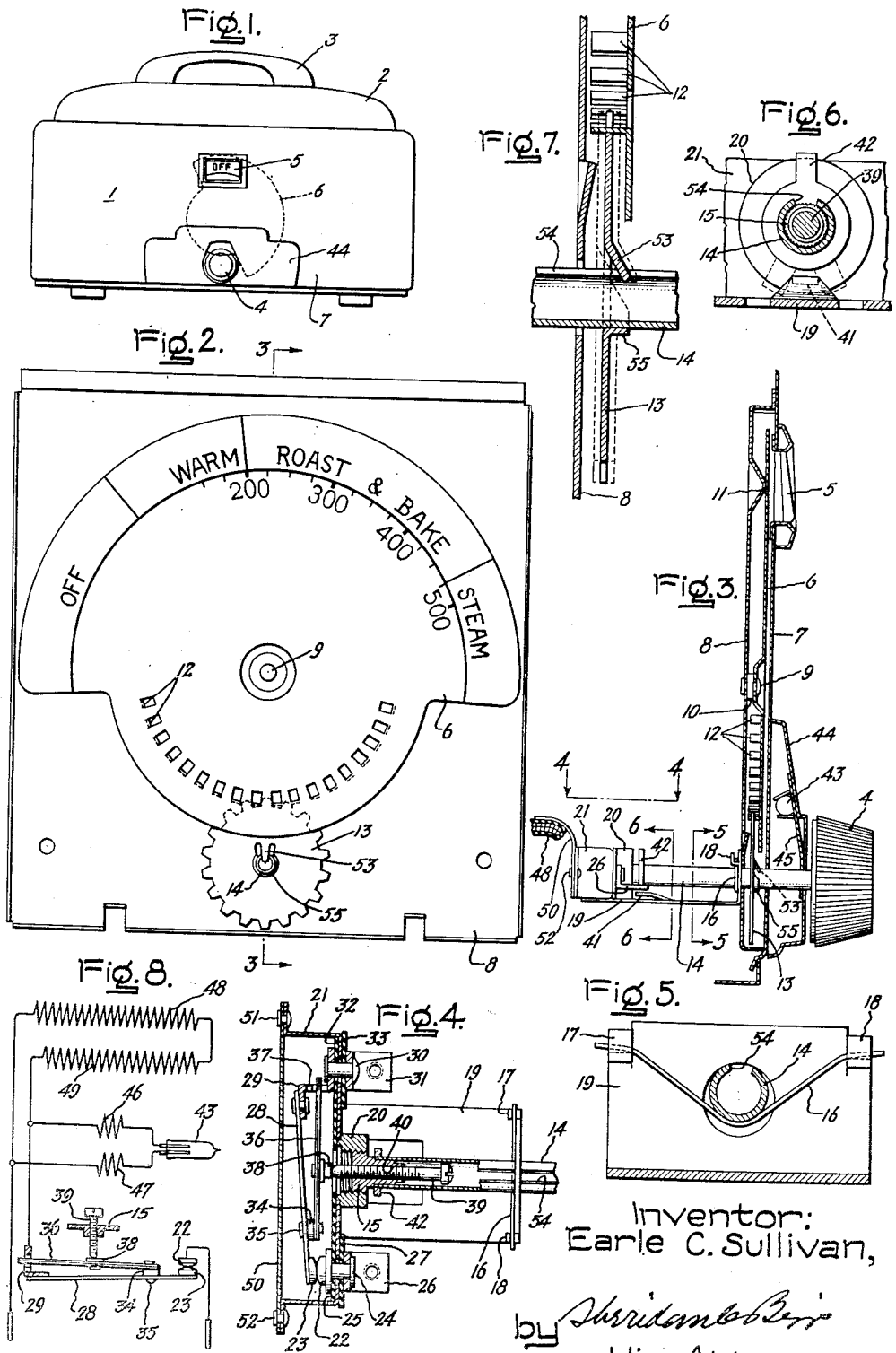

United States Patent Office 2,694,999
Patented Nov. 23, 1954

2,694,999

TEMPERATURE SETTING INDICATOR FOR ELECTRIC ROASTERS AND THE LIKE

Earle C. Sullivan, Bridgeport, Conn., assignor to General Electric Company, a corporation of New York Application April 21, 1951, Serial No. 222,221

1 Claim. (Cl. 116—124)

This invention relates to adjustable thermostatic switches for use with electric roasters and like cooking devices, and more particularly to the adjustment indicating means associated with such switches.

In order that they may be used with a variety of foodstuffs and for a variety of cooking purposes, electric roasters and like devices customarily are provided with heating circuits which may be adjusted to produce various temperatures within a predetermined range. Conventionally, this temperature control is accomplished by means of a thermostatic switch connected serially in the heating circuit and adjustable to open in response to various roaster temperatures. To insure that the switch adjustment is correct for any particular cooking application, it is thus necessary to supply some sort of indicator for giving a visible signal of the roaster temperature at which the switch is set to operate.

It is a general object of this invention, therefore, to provide a new and improved device for indicating the setting of an adjustable thermostatic switch; and it is a more specific object of the invention to provide an electric roaster incorporating such a device to indicate its temperature setting.

In accomplishment of the foregoing objectives, there is provided a roaster wherein the temperature is regulated by a thermostatic switch whose temperature setting is dependent upon the angular position of a rotatable shaft. A gear, as a spur gear, is mounted on the shaft, and disposed to cooperate with the spur gear is a rotatable dial member having gear teeth comprising, in accordance with this invention, struck-out lugs extending outwardly from its surface. The shaft is spring loaded to keep the spur gear teeth in constant engagement with these lanced teeth and thereby eliminate backlash. The angular position of the dial member is thus dependent upon the angular position of the shaft and its periphery is calibrated in degrees to give the temperature setting of the roaster.

The features of this invention, which are believed to be novel, are set forth with particularity in the appended claim. The invention itself, however, both as to organization and mode of operation, together with further objects and advantages thereof, may be best understood by reference to the following description, to be taken in conjunction with the accompanying drawing, in which:

Fig. 1 is a front elevation view of an electric roaster in which is incorporated an adjustable thermostatic switch and an adjustment indicating device embodying this invention;

Fig. 2 is a front elevation view of the adjustment indicating device incorporated in the roaster of Fig. 1;

Fig. 3 is a vertical section taken on the line 3—3 of Fig. 2, showing both the thermostatic switch and the adjustment indicating device;

Fig. 4 is a sectional view taken on the line 4—4 of Fig. 3, showing the construction of the thermostatic switch;

Fig. 5 is a section taken on the line 5—5 of Fig. 3, showing the means for spring loading the shaft of the indicating device;

Fig. 6 is a sectional view taken on the line 6—6 of Fig. 3, showing the thermostatic switch adjusting screw and drive;

Fig. 7 is a fragmentary sectional view showing the gearing structure of the indicating device; and Fig. 8 is a schematic diagram of a heating circuit suitable for use in the roaster.

Referring to Fig. 1, therein is shown an electric roaster 1 having a cooking well or chamber (not shown) to which access is obtained through the removal of a cover 2 by means of a handle 3 mounted thereon. The temperature in the cooking well is regulated by means of a rotatable control knob 4 whose angular position is indicated through a window 5 by a rotatable disk or dial 6. As is shown in Fig. 3, dial 6 is positioned between the front wall 7 of the roaster and a backplate 8, whereon it is rotatably mounted by a rivet 9. A spacing block 10 and a boss 11 protruding from backplate 8 serve to keep the dial spaced away from the backplate. In accordance with this invention, a plurality of equi-spaced lugs or teeth 12 are struck-out from the dial in an arcuate path around its axis of rotation. Engaging these struck-out teeth 12 are the teeth of a spur gear 13, which is mounted on a rotatable shaft 14.

As is shown in Figs. 4 and 6, shaft 14 is secured to and supported by a screw member 15 at its one end and, as shown in Figs. 3 and 5, is supported by but not secured to a bowed spring 16 at a point adjacent gear 13. Spring 16 is itself supported by a pair of L-shaped projections 17 and 18, formed on a thermostat support bracket 19, and biases shaft 14 upwardly to hold the gear teeth in positive engagement with lanced teeth 12. This spring loading of the shaft prevents backlash in the gearing between the shaft and the dial.

The shaft supporting screw member 15 is in threaded engagement with a stationary nut 20 and moves axially within the nut upon the turning of the shaft 14. These screw means, of course, cause shaft 14 also to move axially whenever it is rotated. Nut 20 is mounted on a thermostat housing member 21 which in turn is secured to the thermostat support bracket 19. Bracket 19 is attached to backplate 8 so that the entire control system including the thermostatic switch and the dial is supported from a single member, i. e., the backplate. This permits the control system to be assembled separately from the roaster whereby it may be calibrated before being inserted into the roaster.

Contained within the thermostat housing member 21 is an adjustable thermostatic switch including a fixed contact 22 and a movable contact 23. Contact 22 is secured to the thermostat housing by a rivet 24, but is insulated therefrom by a sheet 25 of electrically insulating material. A terminal 26 is also positioned on rivet 24 to provide means for connecting contact 22 in an electrical circuit, terminal 26 being insulated from the thermostat housing by a sheet 27 of insulating material.

Movable contact 23 is mounted on a spring switch arm 28 which biases it into engagement with fixed contact 22. Switch arm 28 is formed of electrically conducting material and is mounted on housing member 21 by a bracket 29 and a rivet 30. A terminal 31 provides external connecting means for the switch arm, and insulation sheets 32 and 33 electrically insulate the arm and the terminal from the housing.

Mounted at its one end on switch arm 28 by a spacing block 34 and a rivet 35 is a temperature sensitive, bimetallic bar 36. Rivet 35 holds spacing block 34 securely to switch arm 28, but does not bind bimetallic bar 36 in a fixed position. The end of rivet 35 is flared to keep bar 36 thereon, but is so spaced from block 34 that limited pivotal motion of the bar may take place between the flared end of the rivet and the block. The opposite end of bimetallic bar 36 extends into an aperture 37 formed in bracket 29 but is not attached to the bracket in any way.

Secured on bimetallic bar 36 at a point lying between its free end and its end attached to the switch arm is an electrically insulating button 38. This button is disposed to cooperate with a thermostat adjusting pin 39, which is threaded in and extends through a tapped axial recess 40 provided in screw member 15. Since the axial position of screw member 15 changes upon rotation of shaft 14, pin 39 then also moves axially toward or away from button 38 in response to rotation of shaft 14. In order to limit the motion of pin 39, a projection 41 is extended upwardly from support bracket 19 to engage a single-tooth gear 42 mounted on shaft 14. The contact between gear 42 and projection 41 limits the rotation of the shaft to approximately one revolution.

The actuating means for shaft 14 is the aforementioned control knob 4 which is mounted on the opposite end of the shaft. Positioned between the knob and the outer wall 7 of the roaster is a housing assembly for an operation indicating light 43, which is connected in the roasting heating circuit. This housing assembly includes a decorative coverplate 44, and a support plate 45, the light being held between two inwardly extending flanges mounted on plate 45. Windows are cut in both the cover and support plates to allow a view of the indicating light.

As is shown in the schematic circuit of Fig. 8, light 43 with its associated current limiting resistors 46 and 47, is connected in parallel with the serially connected heating elements 48 and 49 of the roaster, and the current to this parallel circuit is controlled by the operation of the thermostatic switch. The operation of the switch from the closed to the open position is caused by the bending of bimetallic bar 36 in response to the heating thereof. A spring plate 50 is employed to conduct heat from the liner (not shown) of the roaster well to the area surrounding the bimetallic bar 36, in order that the action of the bar be responsive to the well temperature. Plate 50, for that purpose, contacts the roaster liner at its one end and forms the rear wall of the switch housing at its other end, being secured to housing member 21 by rivets 51 and 52.

Upon its being heated, bimetallic bar 36 bows in the direction of pin 39, i. e., it bends so that its one end contacts block 34, its other end contacts the edge of aperture 37 adjacent the switch arm, and its center portion keeps button 38 against pin 39. Since the position of the aperture edge is fixed and the position of pin 39 is fixed for any particular position of shaft 14, the only element in the system which can move in response to the bowing of the bimetallic bar is block 34, its movement being accomplished through a movement of spring switch arm 28 against the bias thereof. Thus, upon sufficient heat being supplied through plate 50 to bar 36, the bowing of bar 36 bends switch arm 28 and removes contact 23 from engagement with contact 22. The disengagement of the contacts, of course, opens the heating circuit.

Once the heating circuit is opened, the roaster well liner begins to cool and, as the liner cools, the bimetallic bar will also cool. As the bar cools, it returns from the bowed shape that opened the contacts to progressively less bowed shapes. When the bimetallic bar has cooled to a certain temperature, i. e., straightened sufficiently, switch arm 28 again closes contacts 22 and 23. This reenergizes the heating circuit and reheats bimetallic bar 36 until it again opens the switch. In that manner, the bimetallic bar causes cycling of the roaster temperature around a certain mean value.

This mean value of temperature may be adjusted by changing the axial position of pin 39 through the turning of shaft 14. Viewing the roaster as in Fig. 1, when knob 4 is turned to its extreme right-hand position, pin 39 will be retracted from button 38 as far as possible, screw member 15 and nut 20 being provided with left-hand threads; while, when knob 4 is turned to its extreme left-hand position, pin 39 will be advanced in the direction of button 38 as far as possible. This movement of pin 39 changes the temperature at which switch arm 28 opens the contacts, because it changes one of the fixed points in the bow formed by bimetallic bar 36 upon its being heated.

Specifically, the advancing of pin 39 toward button 38 moves the bight of the bowed bimetallic bar toward switch arm 28, and since the position of one end of the bow is fixed by aperture 37, any particular bow formed by the bar then results in the end of the bar associated with block 34 advancing further in the direction of switch arm 28. Since the sharpness of the bow in bimetallic bar 36 is dependent upon the roaster temperature, the advancing of pin 39 toward button 38 causes the heating circuit to be interrupted at successively lower roaster temperatures, and thus causes the roaster to operate at these lower temperatures. Conversely, moving pin 39 away from button 38 causes the roaster to operate at successively higher temperatures. Calibration of the thermostatic switch to operate within a preselected temperature range may be accomplished by varying the position of pin 39 in recess 40.

In order to provide means for de-energizing the heating circuit at the discretion of the operator, the travel of pin 39 due to turning of shaft 14 is made such that in the extreme right-hand portion of the travel of knob 4, the pin moves the free end of bar 36 into contact with the edge of aperture 37 and then moves the entire bar in a substantially pivotal motion around that point. This causes movement of switch arm 28 and opens the contacts independently of any temperature responsive action. Although the bimetallic bar remains substantially rigid in this operation, any tendency toward bowing is in the reverse direction to the bowing occurring during the temperature responsive cycling action.

As previously mentioned, the angular position of shaft 14 is transmitted by new and improved gearing means to indicating dial 6. Gear 13 may be attached to shaft 14 in a number of ways well-known to the art, but preferably and as illustrated in Fig. 7, shaft 14 is extended through a recess in gear 13 and relative movement between the two is prevented by a key 53 which fits into a keyway 54 formed in the shaft, and by a shoulder 55 that extends partially around the shaft. The use of such a simple mounting structure allows the gear and its mounting means to be formed integrally from sheet metal by a simple stamping operation. Similarly, dial 6 may be stamped from a metal sheet and its struck-out teeth 12 formed in a single operation. As indicated by the dotted lines in Fig. 7, lanced teeth 12 permit gear 13 to be displaced axially with respect to dial 6 upon the rotation of shaft 14 without the gear becoming disengaged from the teeth. This gearing structure, although obviously extremely inexpensive and easy to manufacture, gives equally as good results as do more expensive gearing means. The loading action of spring 16 by keeping gear 13 and teeth 12 in firm engagement permits rapid movement and reversal of shaft 14 with the accompanying axial displacement of gear 13 without there being any danger of backlash.

While there has been described what at present is considered to be the preferred embodiment of this invention, it will be obvious to those skilled in the art that numerous changes and modifications may be made therein without departing from the invention, and it is, therefore, intended in the appended claim to cover all such changes and modifications as fall within the true spirit and scope of this invention.

What I claim as new and desire to secure by Letters Patent of the United States is:

A device for setting and indicating the setting of an adjustable element, comprising a rotatable shaft for adjusting said element, said shaft being mounted for simultaneous axial and rotary movement, a spur gear on said shaft, said shaft and said gear being movable together, the axial range of movement of said shaft and said gear being limited, an indicating dial rotatably mounted adjacent to said shaft and provided with struck-out lugs arranged in an arcuate path and adapted to engage said gear, said lugs being longer than the range of axial movement of said shaft and said gear, said gear being adapted to engage said lugs to turn said dial upon rotation of said shaft, whereby the angular position of said dial indicates the setting of said adjustable element.

References Cited in the file of this patent

UNITED STATES PATENTS

| Number | Name | Date |
|---|---|---|
| 1,386,405 | Hills | Aug. 2, 1921 |
| 1,618,921 | Ford | Feb. 22, 1927 |
| 1,703,498 | Olbon | Feb. 26, 1929 |
| 1,729,046 | Lovejoy | Sept. 24, 1929 |
| 2,034,865 | Hart | Mar. 25, 1936 |
| 2,194,117 | Graham | Mar. 19, 1940 |
| 2,224,552 | Sickinger | Dec. 10, 1940 |
| 2,523,796 | Weeks | Sept. 26, 1950 |